US009894493B2

United States Patent
Chun

(10) Patent No.: US 9,894,493 B2
(45) Date of Patent: Feb. 13, 2018

(54) TELEMATICS PROVISIONING METHOD

(71) Applicant: HYUNDAI MOTOR COMPANY, Seoul (KR)

(72) Inventor: Chang Woo Chun, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 135 days.

(21) Appl. No.: 14/799,263

(22) Filed: Jul. 14, 2015

(65) Prior Publication Data

US 2016/0150556 A1    May 26, 2016

(30) Foreign Application Priority Data

Nov. 26, 2014    (KR) .......................... 10-2014-0166788

(51) Int. Cl.
| | |
|---|---|
| *H04W 4/00* | (2009.01) |
| *H04W 4/06* | (2009.01) |
| *H04W 4/14* | (2009.01) |
| *H04B 1/3822* | (2015.01) |
| *H04L 1/00* | (2006.01) |

(52) U.S. Cl.
CPC ............ *H04W 4/06* (2013.01); *H04B 1/3822* (2013.01); *H04L 1/00* (2013.01); *H04W 4/14* (2013.01)

(58) Field of Classification Search
CPC ........ H04W 4/06; H04W 4/14; H04B 1/3822; H04L 1/00
See application file for complete search history.

(56) References Cited

U.S. PATENT DOCUMENTS

| | | | | |
|---|---|---|---|---|
| 2003/0093199 | A1* | 5/2003 | Mavreas ................ | G07C 5/008 701/31.4 |
| 2004/0012501 | A1* | 1/2004 | Mazzara ................ | G08C 19/28 340/870.11 |
| 2004/0044752 | A1* | 3/2004 | Hamaguchi .......... | G08G 1/0969 709/220 |

(Continued)

FOREIGN PATENT DOCUMENTS

| | | |
|---|---|---|
| JP | 4786457 B2 | 10/2011 |
| KR | 10-2003-0058163 A | 7/2003 |

(Continued)

*Primary Examiner* — Gregory Sefcheck
*Assistant Examiner* — Jael Ulysse
(74) *Attorney, Agent, or Firm* — McDermott Will & Emery LLP

(57) ABSTRACT

A telematics provisioning method is executed by a telematics multimedia system (TMS) center and a telematics unit (TMU), and the TMU is provided in a vehicle to communicate with the TMS center. The method includes executing multicast provisioning; operating a provisioning scheduler to form a provisioning schedule; transmitting a short message service (SMS) from the TMS center to the TMU after the provisioning scheduler operates; identifying whether the TMU executes provisioning based on the provisioning schedule of the SMS; if the TMU does not execute provisioning based on the provisioning schedule of the SMS, reforming, by the TMS center, the provisioning schedule; requesting, by the TMU that receives the SMS from the TMS center, provisioning to the TMS center according to reservation information of the SMS; and executing predetermined provisioning when the TMS center receives the provisioning requested from the TMU.

7 Claims, 17 Drawing Sheets

(56) References Cited

U.S. PATENT DOCUMENTS

| | | | | |
|---|---|---|---|---|
| 2004/0121784 A1* | 6/2004 | Park | H04W 64/00 | 455/456.1 |
| 2004/0180647 A1* | 9/2004 | Schwinke | H04M 3/38 | 455/417 |
| 2004/0203919 A1* | 10/2004 | Ross | H04L 67/18 | 455/456.1 |
| 2005/0075892 A1* | 4/2005 | Watkins | G06Q 10/08 | 705/1.1 |
| 2006/0052092 A1* | 3/2006 | Schwinke | G07C 5/008 | 455/415 |
| 2006/0072756 A1* | 4/2006 | Leimgruber | G06Q 10/02 | 380/270 |
| 2006/0152387 A1* | 7/2006 | Ringel | G07C 5/008 | 340/999 |
| 2006/0217885 A1* | 9/2006 | Crady | G01C 21/00 | 701/469 |
| 2007/0043487 A1* | 2/2007 | Krzystofczyk | G06Q 10/06 | 701/29.5 |
| 2007/0073450 A1* | 3/2007 | Ampunan | G06Q 50/30 | 701/1 |
| 2007/0185728 A1* | 8/2007 | Schwarz | G06Q 10/06 | 701/36 |
| 2007/0191995 A1* | 8/2007 | Laghrari | G06Q 10/00 | 701/1 |
| 2007/0293243 A1* | 12/2007 | Shyr | G01S 5/0027 | 455/456.2 |
| 2009/0135845 A1* | 5/2009 | Husain | H04M 3/5183 | 370/420 |
| 2009/0161836 A1* | 6/2009 | Oesterling | H04M 3/51 | 379/32.01 |
| 2009/0168742 A1* | 7/2009 | Sumcad | G01D 21/00 | 370/345 |
| 2009/0287499 A1* | 11/2009 | Link, II | G06Q 30/018 | 705/317 |
| 2010/0099432 A1* | 4/2010 | Glover | H04W 4/00 | 455/456.1 |
| 2010/0153207 A1* | 6/2010 | Roberts | G01C 21/3679 | 705/14.41 |
| 2010/0161167 A1* | 6/2010 | Leyerle | G08G 1/205 | 701/31.4 |
| 2011/0039533 A1* | 2/2011 | Yi | H04W 48/18 | 455/419 |
| 2011/0105157 A1* | 5/2011 | Nguyen | H04Q 9/00 | 455/466 |
| 2011/0153118 A1* | 6/2011 | Lim | H04M 1/72533 | 701/2 |
| 2011/0282889 A1* | 11/2011 | Gerstberger | G06F 17/30914 | 707/756 |
| 2012/0087293 A1* | 4/2012 | Doherty | H04W 4/14 | 370/312 |
| 2012/0252475 A1* | 10/2012 | Farrell | G08G 1/205 | 455/450 |
| 2013/0090782 A1* | 4/2013 | Yi | H04L 69/22 | 701/2 |
| 2013/0138267 A1* | 5/2013 | Hignite | G06F 17/00 | 701/2 |
| 2013/0295889 A1* | 11/2013 | Das | H04W 4/046 | 455/414.1 |
| 2013/0297456 A1* | 11/2013 | Annan | G06Q 30/06 | 705/26.81 |
| 2013/0310010 A1* | 11/2013 | Yi | H04W 4/20 | 455/414.1 |
| 2013/0321178 A1* | 12/2013 | Jameel | G08G 1/202 | 340/989 |
| 2013/0325521 A1* | 12/2013 | Jameel | G06Q 10/02 | 705/5 |
| 2015/0341757 A1* | 11/2015 | Mannikka | H04W 4/046 | 455/456.2 |
| 2015/0382160 A1* | 12/2015 | Slay, Jr. | H04W 4/12 | 455/466 |
| 2016/0082952 A1* | 3/2016 | Kang | B60W 30/00 | 701/2 |
| 2016/0093216 A1* | 3/2016 | Lee | H04W 4/046 | 340/870.11 |

FOREIGN PATENT DOCUMENTS

| | | |
|---|---|---|
| KR | 10-2004-0035038 A | 4/2004 |
| KR | 10-2005-0064610 A | 6/2005 |
| KR | 10-2007-0057633 A | 6/2007 |
| KR | 10-0863343 B1 | 10/2008 |
| KR | 10-1082679 B1 | 11/2011 |

* cited by examiner

FIG. 2
(Related Art)

| Object | VIN | MDN | Detailed information |
|---|---|---|---|
| ■ | KMHST81D2DU000001 | 010-1234-0001 | Type of vehicle, version ... |
| ■ | KMHST81D2DU000002 | 010-1234-0002 | Type of vehicle, version ... |
| ■ | KMHST81D2DU000003 | 010-1234-0003 | Type of vehicle, version ... |
| □ | KMHST81D2DU000004 | 010-1234-0004 | Type of vehicle, version ... |
| ■ | KMHST81D2DU000005 | 010-1234-0005 | Type of vehicle, version ... |
| ■ | KMHST81D2DU000006 | 010-1234-0006 | Type of vehicle, version ... |
| □ | KMHST81D2DU000007 | 010-1234-0007 | Type of vehicle, version ... |
| ■ | KMHST81D2DU000008 | 010-1234-0008 | Type of vehicle, version ... |
| □ | KMHST81D2DU000009 | 010-1234-0009 | Type of vehicle, version ... |
| ■ | KMHST81D2DU000010 | 010-1234-0010 | Type of vehicle, version ... |
| □ | KMHST81D2DU000011 | 010-1234-0011 | Type of vehicle, version ... |
| □ | KMHST81D2DU000012 | 010-1234-0012 | Type of vehicle, version ... |
| ■ | KMHST81D2DU000013 | 010-1234-0013 | Type of vehicle, version ... |
| ■ | KMHST81D2DU000014 | 010-1234-0014 | Type of vehicle, version ... |
| □ | KMHST81D2DU000015 | 010-1234-0015 | Type of vehicle, version ... |

FIG. 3
(Related Art)

| Object | VIN | MDN | Scheduling arrangement | |
|---|---|---|---|---|
| ■ | KMHST81D2DU000001 | 010-1234-0001 | K vehicles | 20140701 00:00:00 |
| ■ | KMHST81D2DU000002 | 010-1234-0002 | | |
| ■ | KMHST81D2DU000003 | 010-1234-0003 | | |
| ■ | KMHST81D2DU000004 | 010-1234-0004 | | |
| ■ | KMHST81D2DU000005 | 010-1234-0005 | | |
| ■ | KMHST81D2DU000006 | 010-1234-0006 | K vehicles | 20140701 12:00:00 |
| ■ | KMHST81D2DU000007 | 010-1234-0007 | | |
| ■ | KMHST81D2DU000008 | 010-1234-0008 | | |
| ■ | KMHST81D2DU000009 | 010-1234-0009 | | |
| ■ | KMHST81D2DU000010 | 010-1234-0010 | | |
| ■ | KMHST81D2DU000011 | 010-1234-0011 | K vehicles | 20140702 00:00:00 |
| ■ | KMHST81D2DU000012 | 010-1234-0012 | | |
| ■ | KMHST81D2DU000013 | 010-1234-0013 | | |
| ■ | KMHST81D2DU000014 | 010-1234-0014 | | |
| ■ | KMHST81D2DU000015 | 010-1234-0015 | | |

FIG. 10

| Object | Country code | Region code | Service name | Vehicle type code | Terminal code | Software version |
|---|---|---|---|---|---|---|
| ■ | K | All | G2 | DH | MTS-N610 | 1.2.1 |

| Object | VIN | MDN | Detailed information | | | |
|---|---|---|---|---|---|---|
| ■ | ...000001 | ... | Kr | Seoul | G2 | DH | MTS-N610 |
| ■ | ...000002 | ... | Kr | Seoul | G2 | DH | MTS-N610 |
| ■ | ...000003 | ... | Kr | Seoul | G2 | DH | MTS-N610 |
| □ | ...000004 | ... | Kr | Seoul | G2 | DH | MTS-N800 |
| ■ | ...000005 | ... | Kr | Gyeonggi | G2 | DH | MTS-N610 |
| ■ | ...000006 | ... | Kr | Gyeonggi | G2 | DH | MTS-N610 |
| □ | ...000007 | ... | Kr | Gyeonggi | G2 | LF | MTS-N600 |
| ■ | ...000008 | ... | Kr | Busan | G2 | DH | MTS-N610 |
| □ | ...000009 | ... | Kr | Busan | G1 | BH | MTS-N260 |
| ■ | ...000010 | ... | Kr | Incheon | G2 | DH | MTS-N610 |
| □ | ...000011 | ... | US | NY | G2 | DH | MTS-N610 |
| □ | ...000012 | ... | US | LA | G2 | LF | MTS-N600 |

FIG. 11

| Object | Country code | Region code | Service name | Vehicle type code | Terminal code | Software version |
|---|---|---|---|---|---|---|
| ■ | K | All | G2 | DH | MTS-N610 | 1.2.1 |

| Object | VIN | MDN | Reservation time | | Scheduling arrangement |
|---|---|---|---|---|---|
| ■ | ...000001 | ... | 20140701 | 00:00:00 | |
| ■ | ...000002 | ... | 20140701 | 00:00:00 | |
| ■ | ...000003 | ... | 20140701 | 00:00:00 | |
| ■ | ...000004 | ... | 20140701 | 00:00:00 | |
| ■ | ...000005 | ... | 20140701 | 12:00:00 | |
| ■ | ...000006 | ... | 20140701 | 12:00:00 | N vehicles 20140701 00:00:00 |
| ■ | ...000007 | ... | 20140701 | 12:00:00 | |
| ■ | ...000008 | ... | 20140701 | 12:00:00 | |
| ■ | ...000009 | ... | 20140702 | 00:00:00 | |
| ■ | ...000010 | ... | 20140702 | 00:00:00 | |
| ■ | ...000011 | ... | 20140702 | 00:00:00 | |
| ■ | ...000012 | ... | 20140702 | 00:00:00 | |

FIG. 12

| Object | Country code | Region code | Service name | Vehicle type code | Terminal code | Software version |
|---|---|---|---|---|---|---|
| ■ | K | All | G2 | DH | MTS-N610 | 1.2.1 |

| Object | VIN | MDN | Reservation time | | |
|---|---|---|---|---|---|
| | | | Start | End | Period of time |
| ■ | ...000001 | ... | 20140701 | 20140707 | 06:00~10:00 |
| ■ | ...000002 | ... | 20140701 | 20140707 | 06:00~10:00 |
| ■ | ...000003 | ... | 20140701 | 20140707 | T04:T05 |
| ■ | ...000004 | ... | 20140701 | 20140707 | T04:T05 |
| ■ | ...000005 | ... | 20140701 | 20140707 | 10:00~14:00 |
| ■ | ...000006 | ... | 20140701 | 20140707 | 10:00~14:00 |
| ■ | ...000007 | ... | 20140701 | 20140707 | T06:T07 |
| ■ | ...000008 | ... | 20140702 | 20140707 | T06:T07 |
| ■ | ...000009 | ... | 20140708 | 20140714 | 16:00~18:00 |
| ■ | ...000010 | ... | 20140708 | 20140714 | 16:00~18:00 |
| ■ | ...000011 | ... | 20140708 | 20140714 | 18:00~24:00 |
| ■ | ...000012 | ... | 20140708 | 20140714 | T00 |

Scheduling arrangement:
M vehicles 20140701 00:00:00
M vehicles 20140701 12:00:00

| Code for period of time | |
|---|---|
| 00:00~02:00 | T01 |
| 02:00~04:00 | T02 |
| 04:00~06:00 | T03 |
| 06:00~08:00 | T04 |
| 08:00~10:00 | T05 |
| 10:00~12:00 | T06 |
| 12:00~14:00 | T07 |
| 14:00~16:00 | T08 |
| 16:00~18:00 | T09 |
| 18:00~20:00 | T10 |
| 20:00~22:00 | T11 |
| 22:00~24:00 | T12 |
| ALL | T00 |

FIG. 13

| Object | Country code | Region code | Service name | Vehicle type code | Terminal code | Software version |
|---|---|---|---|---|---|---|
| ■ | K | All | G2 | DH | MTS-N610 | 1.2.1 |

| Object | VIN | MDN | Priority Usage frequency | Reservation time Start | End | Period of time |
|---|---|---|---|---|---|---|
| ■ | ...000001 | ... | 20 times/Month | 20140701 | 20140707 | T04 |
| ■ | ...000002 | ... | 19 times/Month | 20140701 | 20140707 | T04 |
| ■ | ...000003 | ... | 19 times/Month | 20140701 | 20140707 | T04 |
| ■ | ...000004 | ... | 16 times/Month | 20140701 | 20140707 | T04:T05 |
| ■ | ...000005 | ... | 15 times/Month | 20140701 | 20140707 | T04:T05 |
| ■ | ...000006 | ... | 15 times/Month | 20140701 | 20140707 | T04:T05 |
| ■ | ...000007 | ... | 15 times/Month | 20140701 | 20140707 | T04:T05 |
| ■ | ...000008 | ... | 15 times/Month | 20140702 | 20140707 | T04:T05 |
| ■ | ...000009 | ... | 14 times/Month | 20140708 | 20140714 | T04:T05 |
| ■ | ...000010 | ... | 13 times/Month | 20140708 | 20140714 | T06:T07 |
| ■ | ...000011 | ... | 5 times/Month | 20140708 | 20140714 | T00 |
| ■ | ...000012 | ... | 0 times/Month | 20140708 | 20140714 | T00 |

Scheduling arrangement:
- N vehicles 20140701 00:00:00
- N vehicles 20140701 12:00:00

| Code for period of time | |
|---|---|
| 00:00~02:00 | T01 |
| 02:00~04:00 | T02 |
| 04:00~06:00 | T03 |
| 06:00~08:00 | T04 |
| 08:00~10:00 | T05 |
| 10:00~12:00 | T06 |
| 12:00~14:00 | T07 |
| 14:00~16:00 | T08 |
| 16:00~18:00 | T09 |
| 18:00~20:00 | T10 |
| 20:00~22:00 | T11 |
| 22:00~24:00 | T12 |
| ALL | T00 |

TELEMATICS PROVISIONING METHOD

CROSS-REFERENCE TO RELATED APPLICATION

This application claims the benefit of priority to Korean Patent Application No. 10-2014-0166788 filed in the Korean Intellectual Property Office on Nov. 26, 2014, the entire contents of which are incorporated herein by reference.

TECHNICAL FIELD

The present invention relates to a telematics provisioning method, and more particularly, to a telematics provisioning method that may apply a reservation schedule that is used in multicast communication while provisioning is executed, wherein the provisioning transmits predetermined information, commands, etc. to a plurality of telematics units, and wherein the plurality of telematics units are provided in various types of vehicles in a wide region and include software of various versions installed thereto. The present invention also relates to a telematics provisioning method that may reduce waste of resources occurring when provisioning execution, resource allocation for a communication connection, holding of a communication channel, request of re-connecting communication, and so on are executed.

BACKGROUND

In vehicle-related technologies, a telematics technology is one of technologies that have been spotlighted.

A vehicle telematics system is a system which combines a mobile communication scheme and a position tracking scheme with the Internet to detect occurrence of a vehicle accident or occurrence of a vehicle theft, to guide a vehicle driving route, and to provide various other information, or the like, to a driver.

In other words, the vehicle telematics system is a system which provides various information using a global positioning system (GPS) and mobile communication.

Therefore, the vehicle telematics system may provide various mobile communication services such as traffic information, a countermeasure against an emergency, remote vehicle diagnosis, use of the Internet (for example, a financial transaction, provision of news, transmission and reception of e-mails, and the like), and the like, to the driver by using the GPS, a wireless communication network, and the Internet network.

One of the reasons why the telematics are significantly spotlighted is that the vehicle industry and the information communication industry are combined with each other to create a new concept value added service capable of maximizing a synergy effect. For this reason, a telematics standardization group has been organized and has performed standardization work for operations and functions of the respective components of the telematics system, for a communication protocol between the respective components, and for services through a communication network.

When the telematics service is realized, the vehicle is reconstructed as a third Internet space following an office and a home through wired and wireless communication networks and a broadcasting network, and is linked to a home network, office automation, and the like, through a mobile communication network, a broadcasting network, and an intelligent terminal, such that a service used in the home and the office may be seamlessly provided in the vehicle.

As shown in FIG. 1, in the related art, the telematics service is generally implemented by communication between a telematics multimedia system (TMS) center 10 and a telematics unit (TMU) 20. The TMS center 10 operates as a server, and the TMU 20 operates as a terminal. Provisioning is executed between the TMS center 10 and the TMU 20 before the telematics service is substantially implemented, as is apparent to those skilled in the art. Such provisioning is well-known to a person of ordinary skill in the art, and thus detailed description thereof will be omitted.

Provisioning executed in a conventional telematics service may be executed or processed as follows.

Referring to FIG. 2, every TMU 20 is selected by vehicle identification number (VIN), and then provisioning therefor is executed one by one.

Referring to FIG. 3, the conventional provisioning is scheduled by a predetermined interval and is periodically tried. To set the schedule for executing the conventional provisioning, TMUs of all the vehicles for which provisioning is executed are divided in units of the number k. The number of k is the number of which the TMS center 10 can execute provisioning.

Referring to FIG. 4, the conventional provisioning, that starts a telematics service from calling by the TMS center 10, transmits a TMU wakeup SMS and information such as reception, transmission, security, etc. to a predetermined header and body according to a provisioning protocol. The TMU wakeup SMS may include information for accessing the TMS center. A predetermined communication may be started for the telematics service when the TMU wakeup SMS is transmitted to the TMU.

Referring to FIG. 5, according to the conventional provisioning that makes the telematics service be started from calling by the TMS center 10, the TMS center 10 allocates resources thereof for provisioning during from when the TMS center 10 transmits the TMU wakeup SMS to the TMU to when the TMS center 10 receives an acknowledgment (ACK) signal corresponding to completion of the provisioning. Accordingly, the TMS center 10 needs to wait for about 2 minutes until receiving a response signal from the TMU 20. The waiting time may occur because of delay of transmission of the TMU wakeup SMS and a process for waking up the TMU 20.

Referring to FIG. 6, in case the TMS center 10 fully uses resources in the conventional provisioning, the TMS center 10 transmits TMU wakeup SMSs corresponding to the number of vehicles in which all the resources of the TMS center 10 are used for provisioning. However, since all the TMUs which receive the TMU wakeup SMSs are not able to execute communication or provisioning, there is a further waste of time due to failure of communication or provisioning.

Referring to FIG. 7, according to the conventional provisioning, the TMS center 10 divides TMUs of all the vehicles into the number of vehicles that the TMS center 10 is capable of covering, and then executes or processes provisioning for the divided TMUs. When provisioning fails, the TMS center 10 retries to execute provisioning according to a retrying logic algorithm. Whenever the TMS center 10 retries to execute provisioning, since a TMU wakeup SMS is transmitted, communication cost for the TMU wakeup SMS increases.

The above information disclosed in this Background section is only for enhancement of understanding of the background of the invention and therefore it may contain information that does not form the prior art that is already known in this country to a person of ordinary skill in the art.

RELATED ART DOCUMENT

Patent Document (Patent Document 1) Japanese Patent No. 4786457 (Jul. 22, 2011)
(Patent Document 2) Korean Patent No. 10-1082679 (Nov. 4, 2011)

SUMMARY

Accordingly, the present disclosure has been made in an effort to provide a telematics provisioning method that may apply a reservation schedule that is used in a multicast communication type while provisioning is executed, wherein the provisioning transmits predetermined information, commands, etc. to a plurality of telematics units, and wherein the plurality of telematics units are provided in various types of vehicles in a wide region and include software of various versions installed thereto. The present disclosure has also been made in an effort to provide a telematics provisioning method that may reduce waste of resources occurring when provisioning execution, resource allocation for a communication connection, holding of a communication channel, request of re-connecting communication, and so on are executed.

An exemplary embodiment of the present invention provides a telematics provisioning method executed by a telematics multimedia system (TMS) center and a telematics unit (TMU), wherein the TMS center operates as a server, and the TMU is provided in a vehicle to communicate with the TMS center. The telematics provisioning method includes: executing, by the TMS center, multicast provisioning; operating, by the TMS center, a provisioning scheduler to form or write a provisioning schedule a provisioning schedule; transmitting a short message service (SMS) from the TMS center to the TMU after the provisioning scheduler operates, wherein the SMS includes information reserving the provisioning schedule; identifying whether the TMU executes provisioning based on the provisioning schedule of the SMS; if the TMU does not execute provisioning based on the provisioning schedule of the SMS, reforming, by the TMS center, the provisioning schedule with respect to the TMU which does not execute provisioning; requesting, by the TMU that receives the SMS from the TMS center, provisioning to the TMS center according to reservation information of the SMS; and executing, by the TMS center, predetermined provisioning when the TMS center receives the provisioning requested from the TMU.

In certain embodiments, the executing of the predetermined provisioning may include: transmitting data for executing the predetermined provisioning to the TMU that requested the provisioning; receiving, from the TMU, an acknowledgement (ACK) signal when the TMU receives the data; and ending the predetermined provisioning when the TMS center receives the ACK signal.

In certain embodiments, the executing of the multicast provisioning may include: forming a reservation provisioning table with information such as a region, a type of vehicle, a kind of TMU, and a software version to selectively execute provisioning for each of a plurality of vehicles; and applying the reservation provisioning table.

In certain embodiments, the operating of the provisioning scheduler may include setting and inputting predetermined values to reserve schedules such as time, day, period, and priority.

In certain embodiments, the operating of the provisioning scheduler may include setting time that each of a plurality of TMUs is separately able to access the TMS center.

In certain embodiments, the telematics provisioning method may further include setting higher reservation priority to a TMU that communicates with the TMS center frequently.

In certain embodiments, the TMU may request provisioning to the TMS center when a schedule included in the SMS transmitted from the TMS center arrives.

In certain embodiments, the TMS center may allocate resources thereof only from when the TMU requests the provisioning to the TMS center according to reservation information to when the TMS center transmits the ACK signal to the TMU.

In certain embodiments, the TMS center maintains or increases the provisioning schedule and then re-reserves the provisioning schedule with respect to a TMU that does not execute the provisioning according to the provisioning schedule.

In certain embodiments, the telematics provisioning method may further include: setting higher priority of provisioning reservation for a TMU that first communicates with the TMS center; and setting higher priority of provisioning reservation for a vehicle in which trouble frequently occurs among vehicles that use the TMS center.

BRIEF DESCRIPTION OF THE DRAWINGS

FIGS. 2 through 7 are drawings for illustrating provisioning examples executed for a telematics service according to the related art, wherein FIG. 2 is a drawing for illustrating provisioning for each vehicle, FIG. 3 is a drawing for illustrating a provisioning schedule, FIGS. 4 and 5 are drawings for illustrating provisioning protocols, FIG. 6 is a drawing for illustrating resource distribution, and FIG. 7 is a drawing for illustrating re-scheduled provisioning.

FIGS. 10 through 17 are drawings for illustrating operation of a telematics provisioning method according to an exemplary embodiment of the present invention, wherein FIG. 10 is a multicast provisioning table which is compared with FIG. 2, FIG. 11 is a reservation scheduling table for provisioning which is compared with FIG. 3, FIG. 12 is a reservation scheduling table that a TMU accesses a TMS center, FIG. 13 is a reservation scheduling table based on a priority ranking, FIGS. 14 and 15 are drawings for illustrating processes of Semi-MT provisioning protocols, which are respectively compared with FIGS. 4 and 5, FIG. 16 is a drawing for illustrating resource distribution of Semi-MT provisioning, which is compared with FIG. 6, and FIG. 17 is a drawing for illustrating re-scheduling for Semi-MT provisioning, which is compared with FIG. 7.

DETAILED DESCRIPTION

Figure 1:
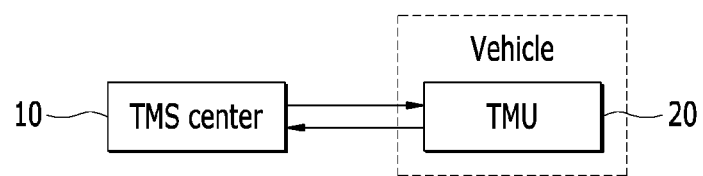
FIG. 1 is a schematic diagram for illustrating connection between a TMS center and a TMU for provisioning in related art.

Embodiments of the present invention will be described more fully hereinafter with reference to the accompanying drawings. As those skilled in the art would realize, the described embodiments may be modified in various different ways, all without departing from the spirit or scope of the present invention.

In addition, in the specification, unless explicitly described to the contrary, the word "comprise" and variations such as "comprises" or "comprising" will be understood to imply the inclusion of stated elements but not the exclusion of any other elements.

Like reference numerals designate like elements throughout the specification.

Figure 9:
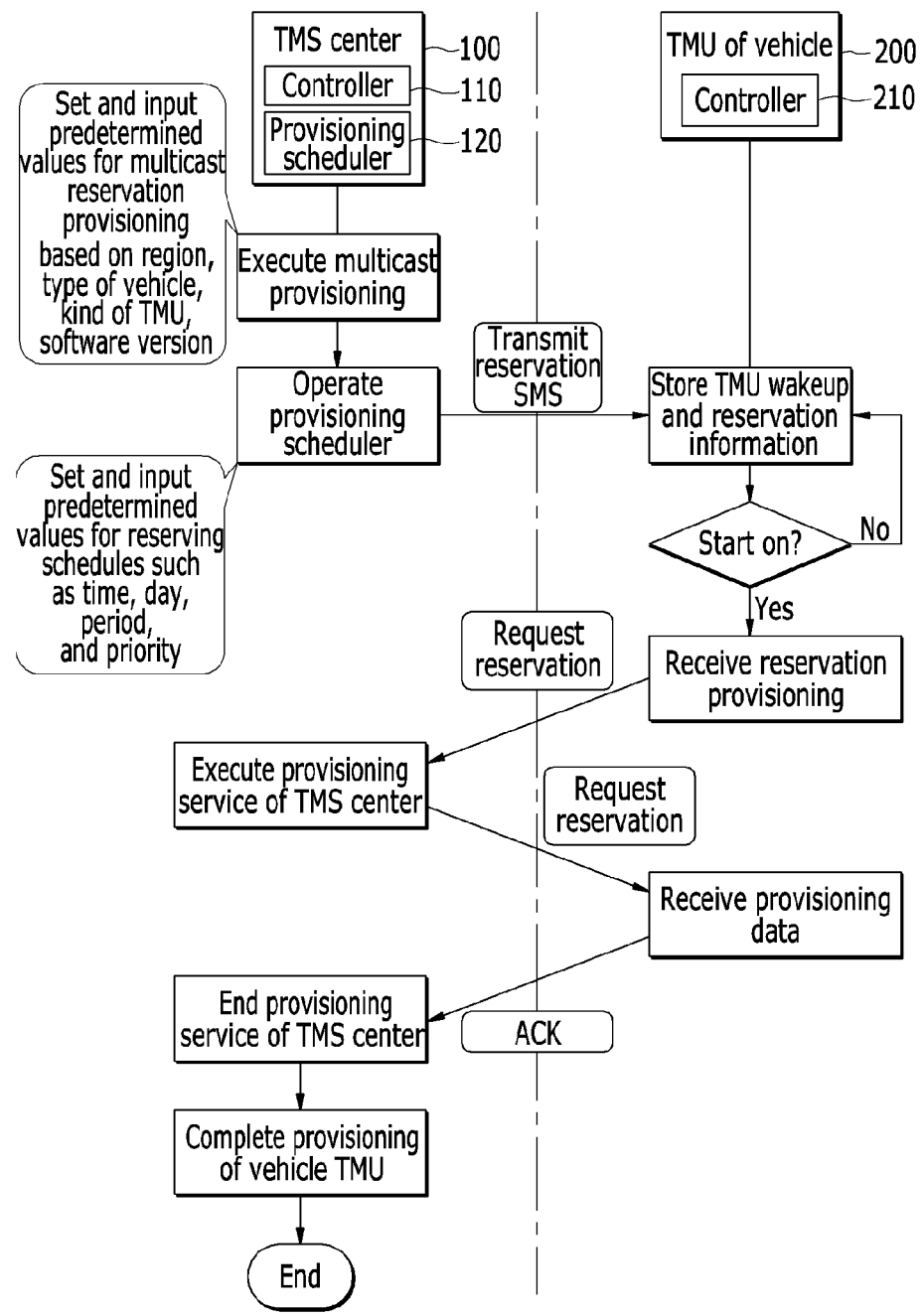
FIG. 9 is a drawing for illustrating that a telematics provisioning method according to an exemplary embodiment of the present invention is executed between a TMS center and a TMU.

FIG. 9 is a schematic drawing for illustrating a telematics system in which a telematics provisioning method according to an exemplary embodiment of the present invention is executed.

The telematics system for executing the telematics provisioning method according to the exemplary embodiment of the present invention may include a telematics multimedia system (TMS) center 100 and a telematics unit (TMU) 200. The TMS center 100 operates as a server, and the TMU 200 is provided in a vehicle to communicate with the TMS center 100.

The TMS center 100 includes a controller 110 and a provisioning scheduler 120. The controller 110 controls a general operation of the TMS center 100, and the provisioning scheduler 120 executes provisioning scheduling under control of the controller 110. The TMU 200 includes a controller 210 that controls a general operation of the TMU 200.

In certain embodiments, each of the controllers 110 and 210 may be one or more microprocessors and/or hardware including a microprocessor that can be operated by a predetermined program, wherein the predetermined program may include a series of commands for executing the telematics provisioning method to be described next according to an exemplary embodiment of the present invention.

A telematics provisioning method will now be described in detail with reference to the accompanying drawings.

Figure 8:
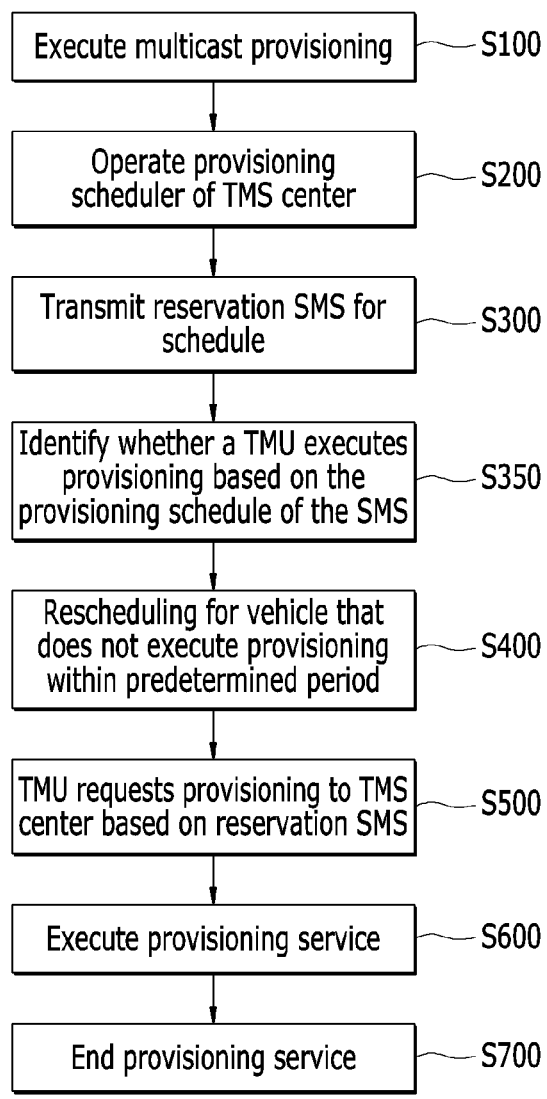
FIG. 8 is a flowchart of a telematics provisioning method according to an exemplary embodiment of the present invention.

FIG. 8 is a flowchart of a telematics provisioning method according to an exemplary embodiment of the present invention, and FIG. 9 is a schematic drawing for illustrating processes of a telematics provisioning method according to an exemplary embodiment of the present invention in terms of a telematics system.

Referring to FIGS. 8 and 9, when multicast provisioning is executed in the TMS center 100 by the controller 110, the controller 110 controls the provisioning scheduler 120 to form or write provisioning scheduling (S200). In certain embodiments, the provisioning scheduler 120 may consist of software.

After the provisioning scheduler 120 operates, the controller 110 of the TMS center 100 transmits an SMS for reserving a provisioning schedule, a provisioning arrangement, and the like to the TMU 200 of each of a plurality of vehicles (S300).

After the controller 110 transmits the SMS to the TMU 200 of each of the plurality of vehicles, the controller 110 may identify whether the TMU 200 executes provisioning according to the provisioning schedule of the SMS (S350). The controller 110 may identify whether the TMU 200 executes provisioning according to the provisioning schedule of the SMS, by checking whether the TMU requests provisioning to the TMS center according to a reservation provisioning schedule included in the SMS.

If a TMU does not request provisioning to the TMS center 100 according to the reservation provisioning schedule included in the SMS, the controller 110 may reform or rewrite a provisioning schedule for the TMU that does not request the provisioning to the TMS center 100, namely, that does not execute provisioning (S400).

In addition, the TMS center 100 may maintain or increase the reservation provisioning schedule and then re-reserve a provisioning schedule for the TMU that does not execute provisioning, thereby increasing a subsequent provisioning success rate.

Meanwhile, the TMU 200 that receives an SMS transmitted from the TMS center 100 may request provisioning to the TMS center 100 according to the reservation schedule included in the SMS (S500).

When the TMS center 100 receives provisioning requested from the TMU 200 on the reservation schedule, the TMS center 100 and the TMU 200 execute predetermined provisioning with each other (S600).

In certain embodiments, when the TMS center 100 receives the provisioning requested from the TMU 200 on the reservation schedule, the TMS center controller 110 transmits data for executing the provisioning to the TMU 200 that requests the provisioning, when the TMU 200 receives the data for executing the provisioning, the TMU 200 transmits an ACK signal to the TMS center 100, and when the TMS center 100 receives the ACK signal, the controller 110 of the TMS center 100 may end the provisioning (S700).

Referring FIGS. 9 and 10, in certain embodiments, in the executing of the multicast provisioning at step 100, the TMS center 100 or the TMU 200 may form or rewrite a reservation provisioning table with information such as a region, a type of vehicle, a kind of TMU, and a software version to selectively execute provisioning for a plurality of vehicles, and may apply the reservation provisioning table to the multicast provisioning.

In other words, the TMS center 100 according to the exemplary embodiment of the present invention may include a multicast provisioning table so that selective provisioning may be conveniently executed for each of TMUs of a plurality of vehicles, as shown in FIG. 10.

Referring to the multicast provisioning table shown in FIG. 10 which is compared with FIG. 2 related to the conventional art, reservation scheduling may be applied to each of vehicles of a predetermined group, and a reservation SMS for calling Semi-MT provisioning is transmitted to each of vehicles of the predetermined group.

The term "Semi-MT" (semi-mobile terminated) provisioning may be a term used in this specification only so that features of the exemplary embodiment of the present invention may be emphasized, but even if the term is omitted, embodiments of the invention will be easily understood with reference to the accompanying drawings and the detailed description by those skilled in the art.

As shown in FIGS. 9, 11, and 12, in the operating of the provisioning scheduler 120 at step 200, the TMS center 100 or the TMU 200 may set and input determined (e.g. predetermined) values to reserve schedules such as time, day, period, and priority. FIG. 11 is a drawing which is compared with FIG. 3 of the conventional art.

In certain embodiments, in the operating of the provisioning scheduler 120 at step 200, the controller 110 of the TMS center 100 may set a time or a period of time that each of a plurality of TMUs is separately able to access the TMS center 100.

For example, as shown in FIGS. 11 and 12, the controller 110 may set and reserve a time and/or a period of time that each of N TMUs of the selected group of vehicles is able to access the TMS center 100, using the multicast provisioning table, and may transmit reservation SMSs for calling provisioning to all the TMUs at once based on a set scheduling arrangement. The TMU 200 provided in the vehicle may request provisioning to the TMS center 100 at the time and/or the period of time included in the SMS transmitted from the TMS center 100.

Since, in certain embodiments, the controller 110 of the TMS center 100 may divide vehicles into groups based on the time or the period of time, the controller 110 may prevent provisioning requests from concentrating at a specific time of a specific day.

For this, in certain embodiments, the controller 110 may set a specific time or a period of time, or may set a code for a specific time or a period of time, and may use the set code.

In certain embodiments, the controller 110 may divide and transmit reservation SMSs in a unit of the number M (M<N) in consideration of an amount of SMSs to be transmitted.

Referring to FIG. 13, in certain embodiments, the controller 110 may set higher reservation priority to a TMU that frequently accesses or communicates with the TMS center 100.

In certain embodiments, the controller 110 may arrange, as shown in FIG. 13, provisioning for N vehicles of the selected group of vehicles so that customers/vehicles using the TMS center 100 more frequently may have higher priorities.

In certain embodiments, information for the priorities may be the latest use order, usage frequency per month, trouble frequency, and so on. Therefore, the controller 110 may first provide new information of the TMS center, updated information, additional service items, and the like, to the customers/vehicles which use the TMS center 100 frequently.

Figure 4:
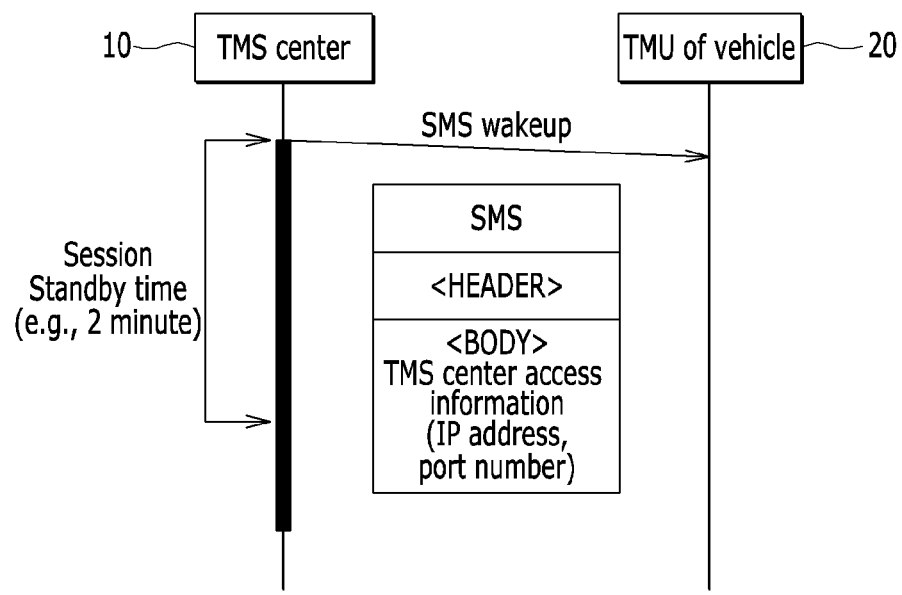
Figure 14:
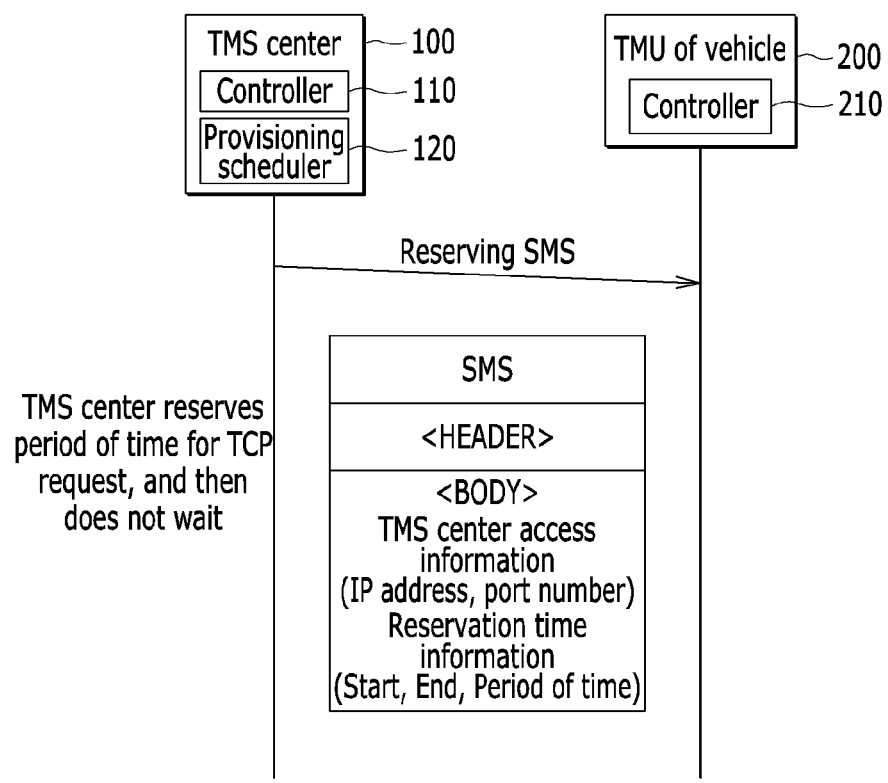

Referring to FIG. 14 which is compared with FIG. 4, in certain embodiments, the provisioning method according to the exemplary embodiment of the present invention may additionally include transmitting reservation time information (e.g., start, end, period of time, etc.) in a reservation SMS with a predetermined header and body according to a provisioning protocol.

In certain embodiments, the reservation SMS including the reservation time information may be a message which is transmitted from the TMS center 100 to the TMU 200 to invoke mobile oriented (MO) provisioning to reserve access time for provisioning, not to start a provisioning service. Accordingly, in certain embodiments, an access request is transmitted from the TMU 200 to the TMS center 100 at the reserved access time. The term "MO" represents that the TMU calls or requests a service from the TMS center.

Figure 5:
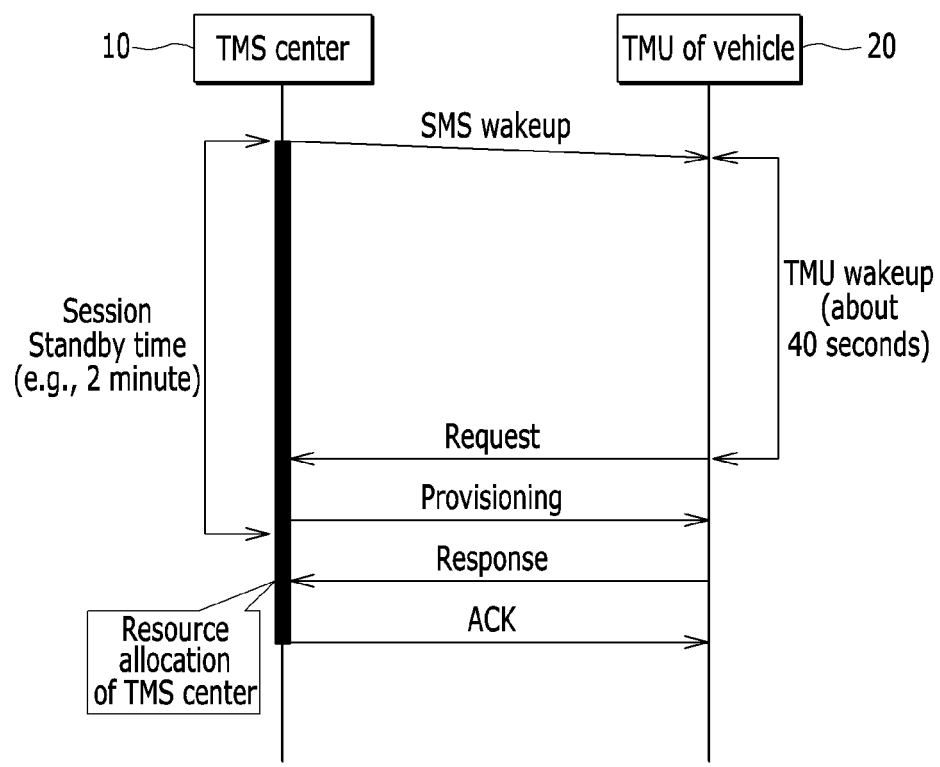
Figure 15:
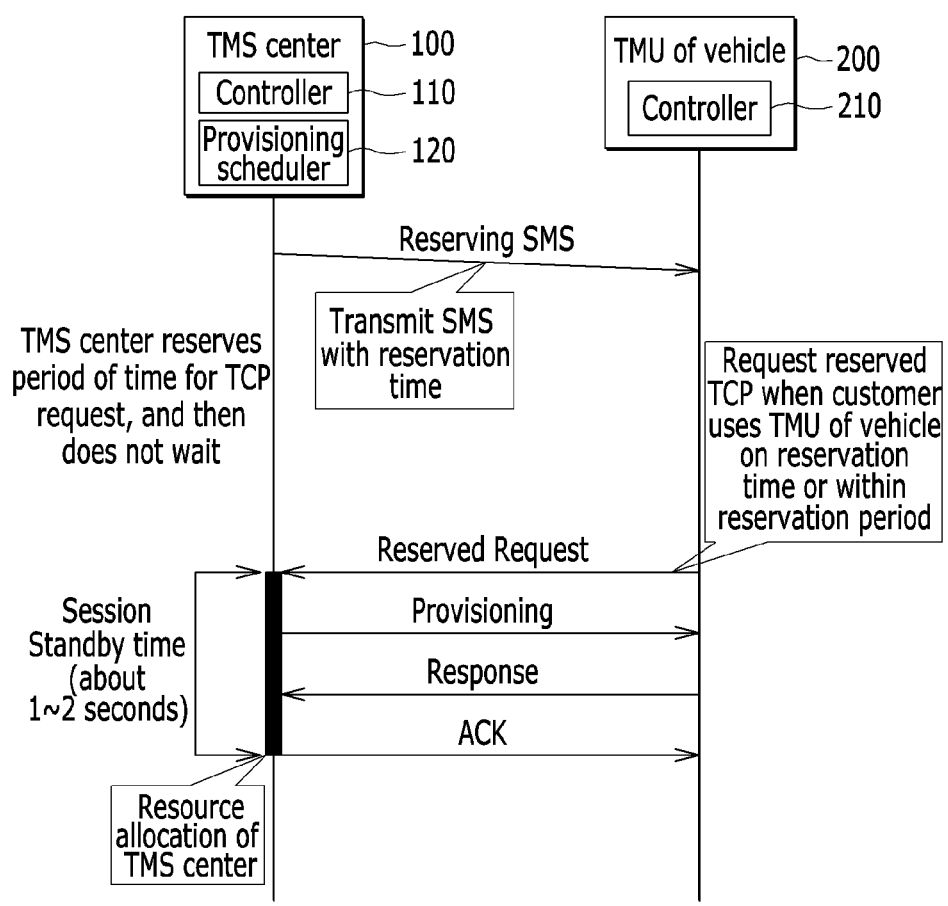

Referring to FIG. 15 which is compared with FIG. 5, in provisioning according to an embodiment of the present invention, the TMS center 100 allocates resources thereof only from when the TMU 200 receives the reservation request to when the TMU 200 transmits the ACK signal to the TMS center 100, not necessarily from when the TMS center 100 transmits the SMS. Therefore, efficiency and reduction of a waste element may be achieved by over about 20~100 times, in terms of resources provided in the TMU center 100, compared with the conventional art.

Figure 6:
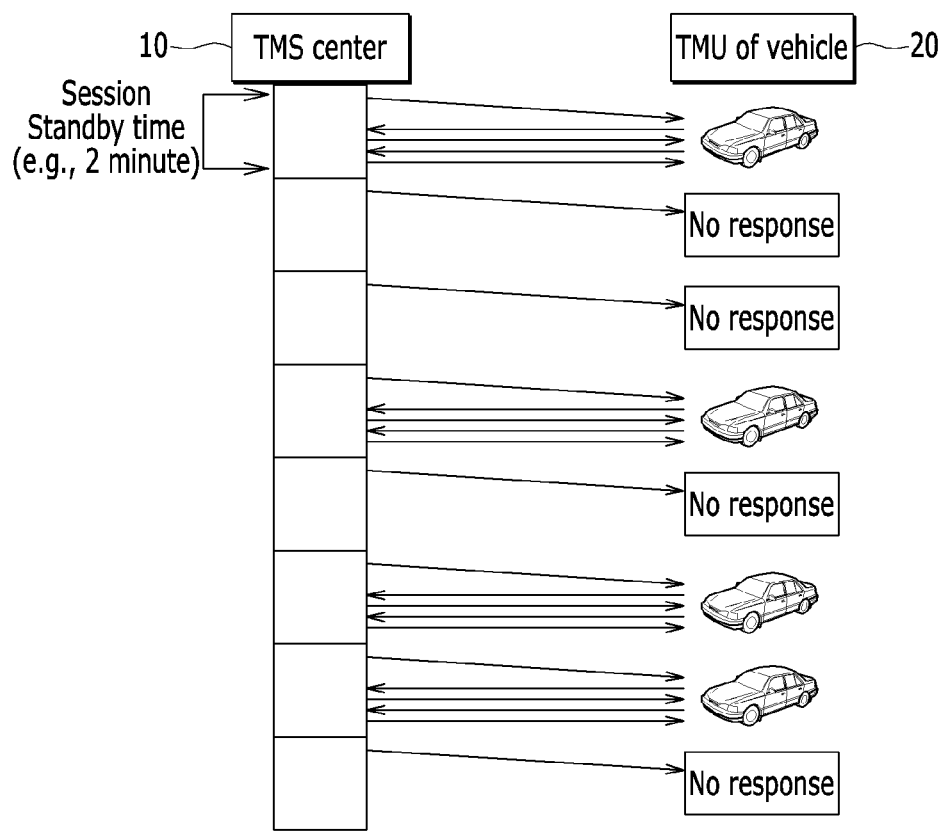
Figure 16:
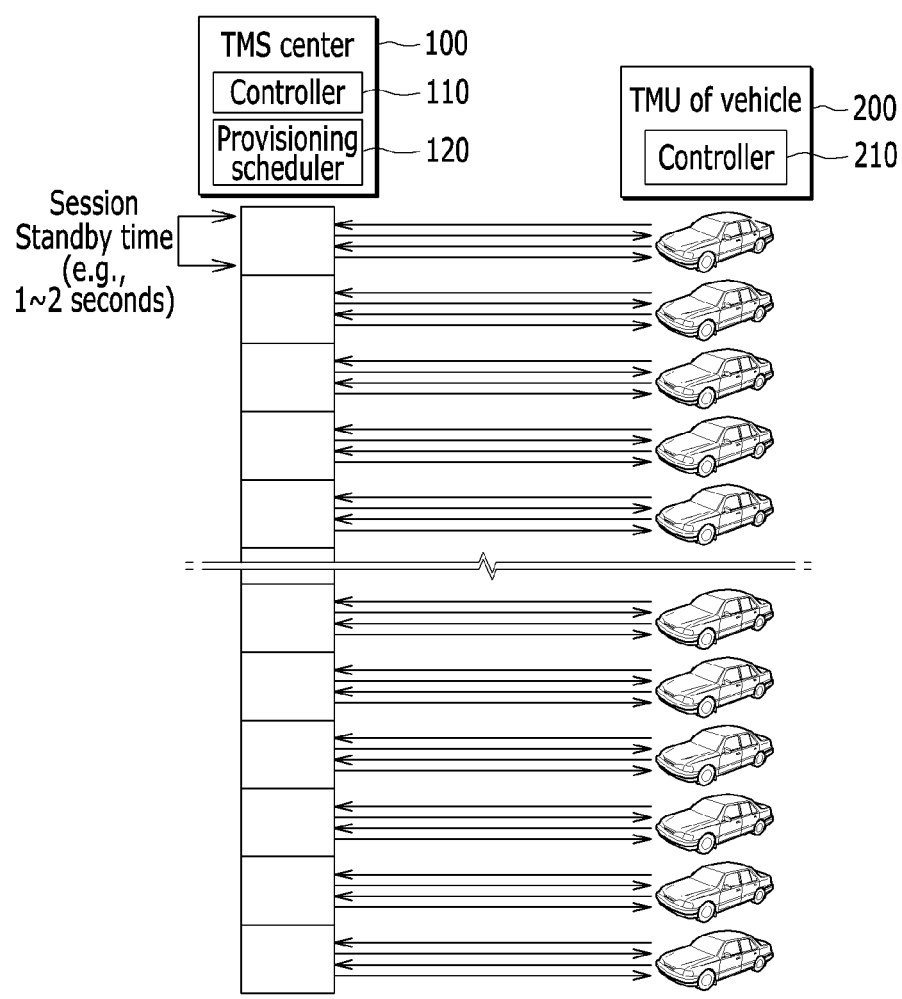

Referring to FIG. 16 which is compared with FIG. 6, in provisioning according to an exemplary embodiment of the present invention, after the TMS center 100 first transmits a reservation SMS to each of a plurality of TMUs 200, since TMUs 200 that are able to communicate with the TMS center 200 based on a schedule of the reservation SMS request telematics services to the TMS center 100, resources of the TMS center 100 may be used more efficiently than those of the conventional art.

Figure 7:
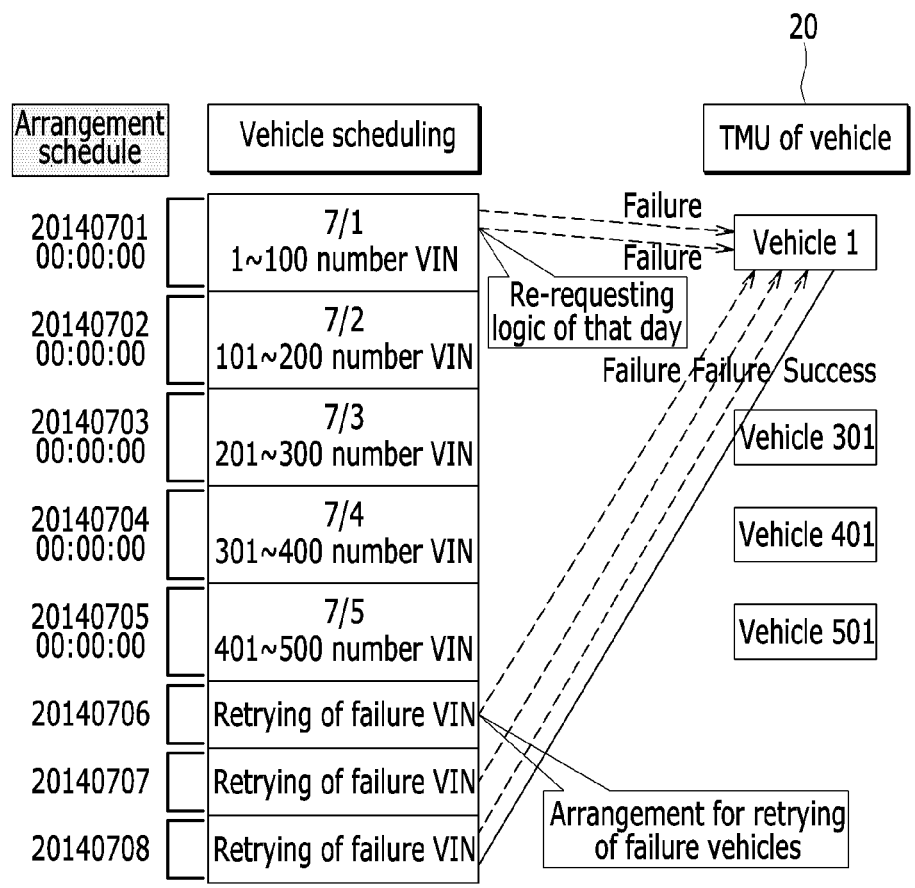
Figure 17:
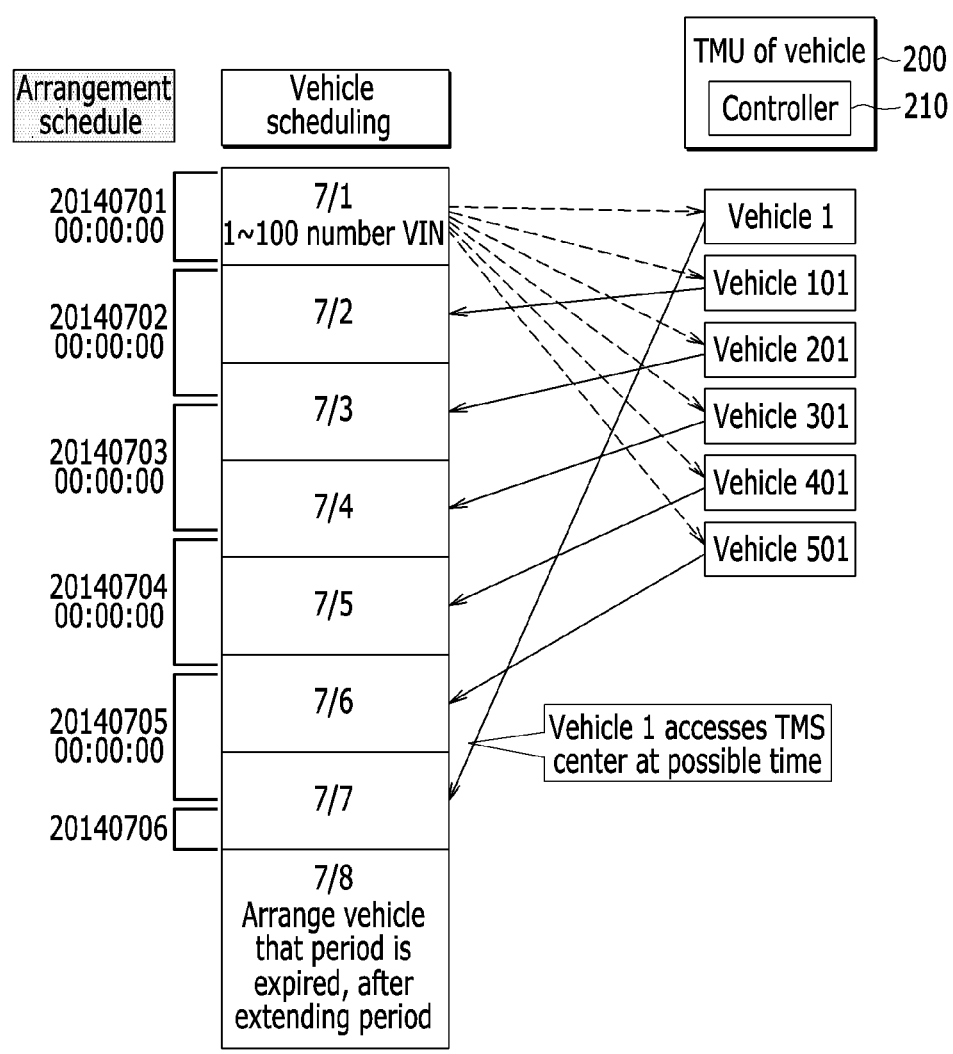

Referring to FIG. 17 which is compared with FIG. 7 of the conventional art, in provisioning according to an exemplary embodiment of the present invention, after the TMS center 100 first transmits a reservation SMS to each of a plurality of TMUs 200, the TMS center 100 can wait until TMUs 200 are in a possible communication state. Accordingly, since the TMS center 100 retransmits a reservation SMS to a TMU 200 that does not request access to the TMS center 100 after extending an access period, frequency and cost of transmitting an SMS may be reduced by about 50~80%, compared with the conventional art.

Therefore, according to the exemplary embodiment of the present invention, a reservation schedule that is used in a multicast communication type may be applied while provisioning is executed, wherein the provisioning transmits predetermined information, commands, etc. to a plurality of telematics units, and wherein the plurality of telematics units are provided in various types of vehicles, in certain embodiments, in a wide region and, in certain embodiments, include software of various versions installed thereto. In addition, resource waste may be reduced when provisioning execution, resource allocation for a communication connection, holding of a communication channel, request of re-connecting communication, and so on are executed.

As described above, according to the exemplary embodiments of the present invention, it is possible to achieve the following effects.

1. According to an exemplary embodiment of the present invention, drawbacks and waste elements of the conventional provisioning service may be improved or reduced, wherein the provisioning service is necessary in telematics services such as subscribing to telematics services, opening of telematics service changing/cancelling of charge, setting of telematics services, notifying of information from a TMS center, and the like.

2. According to an exemplary embodiment of the present invention, reduction of communication charge, enhancement of telematics service and performance, customer satisfaction, and so on may be achieved since a new semi-mobile terminated (Semi-MT) provisioning method which can effectively and efficiently execute large-scale provisioning may be used. The MT is defined as calling a service from a TMS center to a TMU.

3. According to an exemplary embodiment of the present invention, telematics service performance and managing convenience may be enhanced and improved since selective multicast provisioning may be executed in units of a region, a type of vehicle, a kind of service and TMU, and a software version.

4. According to an exemplary embodiment of the present invention, provisioning can be efficiently executed since TMUs of vehicles may be divided into some groups and be able to transmit an SMS which reserves, in advance, schedules for accessing a TMS center without repeatedly transmitting SMSs.

5. According to an exemplary embodiment of the present invention, customer satisfaction and service success rate are improved by customer priority-based scheduling management. In other words, it is possible to preferentially execute provisioning for updated information and notification, and newly set service information for customers who frequently use telematics services; it is possible to handle customer's complaints in advance by collecting vehicle information for customers who experience frequent trouble occurrence and by changing a period of collecting the vehicle information; and it is possible to improve service success rate of provisioning by reserving a schedule with priority that is proportional to usage rate.

6. According to an exemplary embodiment of the present invention, it is possible to reduce resources (e.g., memory, CPU, network occupation, etc.) of the TMS center by using Semi-MT provisioning. In other words, it is possible to reduce waste of resource of the TMS center by standing by an SMS transmission delay and a TMU wakeup time since a TMS center allocates resources thereof from when a reservation request from a TMU that is able to communicate with the TMS center is received to the TMS center.

7. According to an exemplary embodiment of the present invention, it is possible to improve a usage rate of resources of a TMS center by using Semi-MT provisioning. In other words, it is possible to improve service process performance of a TMS center since the TMS center can use a few resources thereof, and to improve a usage rate of resources of the TMS center since provisioning can be executed based on a scheduled procedure in terms of the TMS center.

8. According to an exemplary embodiment of the present invention, it is possible to reduce SMS transmission cost by applying a reservation schedule of Semi-MT provisioning. In other words, it is possible to reduce SMS transmission frequency, thereby reducing cost due to SMS transmission since an SMS is able to be transmitted by a predetermined period, not every day, and a reservation SMS is able to be transmitted while prolonging a period to access a TMS center. In addition, it is possible to reduce communication cost and to improve a service success rate since a transmission failure rate of a wakeup SMS for trying Semi-MT provisioning decreases. In certain embodiments, a wakeup SMS may be transmitted when the TMS center does not recognizes a state in which a TMU is not able to communicate with the TMS center.

While practical exemplary embodiments of the present invention have been described above, it is to be understood that the invention is not limited to the disclosed embodiments, but, on the contrary, is intended to cover various modifications and equivalent arrangements included within the spirit and scope of the appended claims.

What is claimed is:

1. A telematics provisioning method executed by a telematics multimedia system (TMS) center and a telematics unit (TMU), wherein the TMS center operates as a server, and the TMU is provided in a vehicle to communicate with the TMS center, the telematics provisioning method comprising:
   executing, by the TMS center, multicast provisioning;
   operating, by the TMS center, a provisioning scheduler to form or write a provisioning schedule;
   transmitting a short message service (SMS) from the TMS center to the TMU after the provisioning scheduler operates, wherein the SMS comprises information reserving the provisioning schedule;
   identifying whether the TMU executes provisioning based on the provisioning schedule of the SMS;
   if the TMU does not execute provisioning based on the provisioning schedule of the SMS, reforming, by the TMS center, the provisioning schedule with respect to the TMU which does not execute provisioning;
   requesting, by the TMU that receives the SMS from the TMS center, provisioning to the TMS center according to reservation information of the SMS;
   executing, by the TMS center, predetermined provisioning when the TMS center receives the provisioning requested from the TMU; and
   setting higher reservation priority to a TMU that more frequently communicates with the TMS center,
   wherein the executing of the multicast provisioning comprises:
      forming, by the TMS center, a reservation provisioning table with information including a region, a type of vehicle, and a software version of TMU to selectively execute provisioning for each of a plurality of vehicles; and
      applying, by the TMS center, the reservation provisioning table, and
      wherein the operating of the provisioning scheduler comprises setting a time or a period of time that each of a plurality of TMUs included in the vehicles is individually able to access the TMS center.

2. The telematics provisioning method of claim 1, wherein the executing of the predetermined provisioning comprises:
   transmitting data for executing the predetermined provisioning to the TMU that requested the provisioning;
   receiving, from the TMU, an acknowledgement (ACK) signal when the TMU receives the data; and
   ending the predetermined provisioning when the TMS center receives the ACK signal.

3. The telematics provisioning method of claim 2, wherein the TMS center allocates resources thereof only from the time the TMU requests the provisioning to the TMS center according to the reservation information of the SMS to the time the TMS center transmits the ACK signal to the TMU.

4. The telematics provisioning method of claim 1, wherein the operating of the provisioning scheduler comprises
   setting and inputting determined values including time, day, period, and priority in order to reserve schedules.

5. The telematics provisioning method of claim 1, wherein the step of requesting provisioning from the TMS center is performed at a scheduled time included in the SMS transmitted from the TMS center.

6. The telematics provisioning method of claim 1, wherein the TMS center maintains or increases the provisioning schedule and then re-reserves the provisioning schedule with respect to a TMU that does not execute the provisioning according to the provisioning schedule.

7. The telematics provisioning method of claim 1, further comprising:
   setting higher priority of provisioning reservation for a TMU that first communicates with the TMS center than for TMUs that communicate with the TMS center after the TMU that first communicates with the TMS center; and
   setting higher priority of provisioning reservation for a vehicle in which trouble more frequently occurs than for vehicles in which trouble less frequently occurs among vehicles that use the TMS center.

\* \* \* \* \*